Nov. 19, 1929.  E. VOLLRATH  1,736,559
COMBINATION BELT PUNCHING AND CUTTING MACHINE
Filed Sept. 18, 1925   2 Sheets-Sheet 1
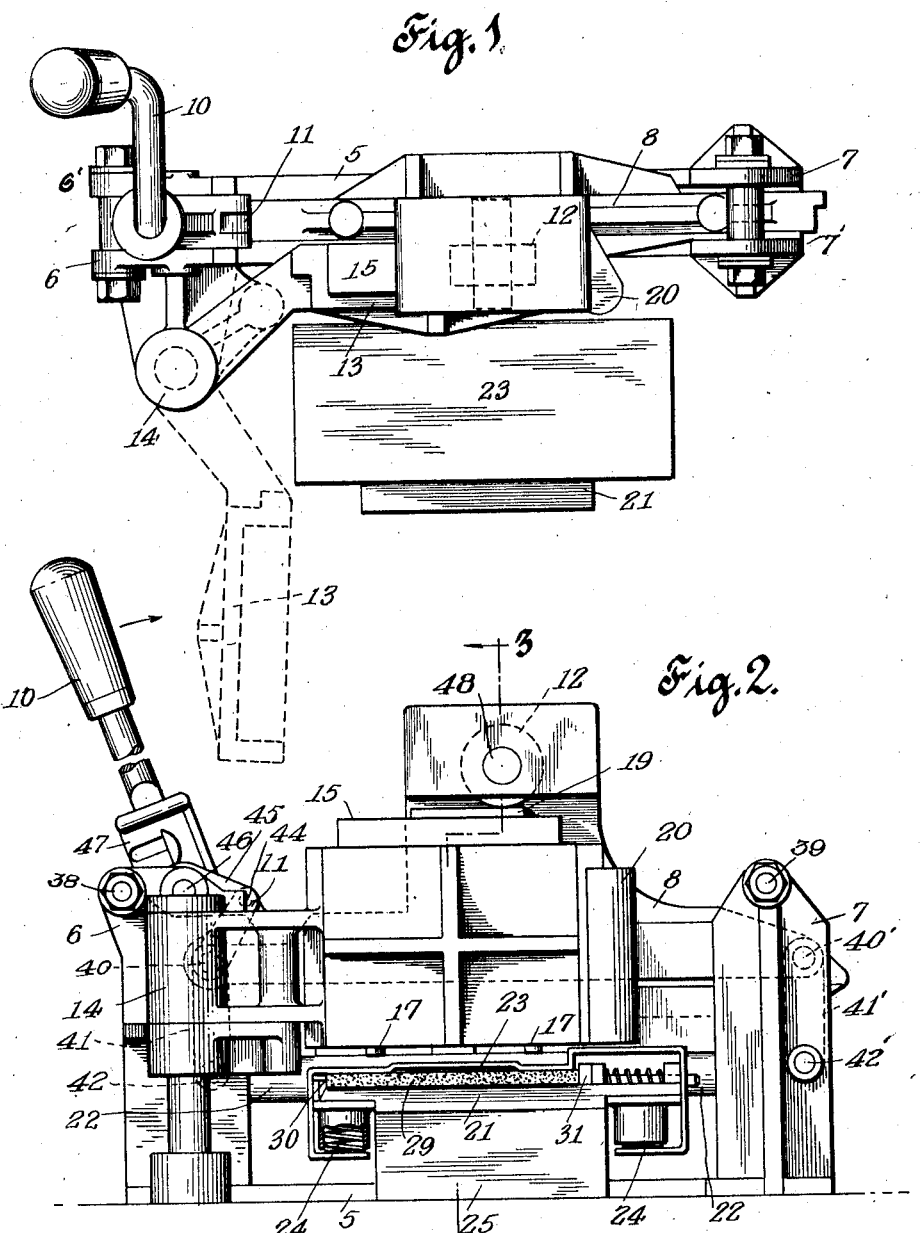
INVENTOR
Edwin Vollrath
BY
Hervey Barber & McKee
ATTORNEY Nov. 19, 1929.  E. VOLLRATH  1,736,559
COMBINATION BELT PUNCHING AND CUTTING MACHINE
Filed Sept. 18, 1925  2 Sheets-Sheet 2
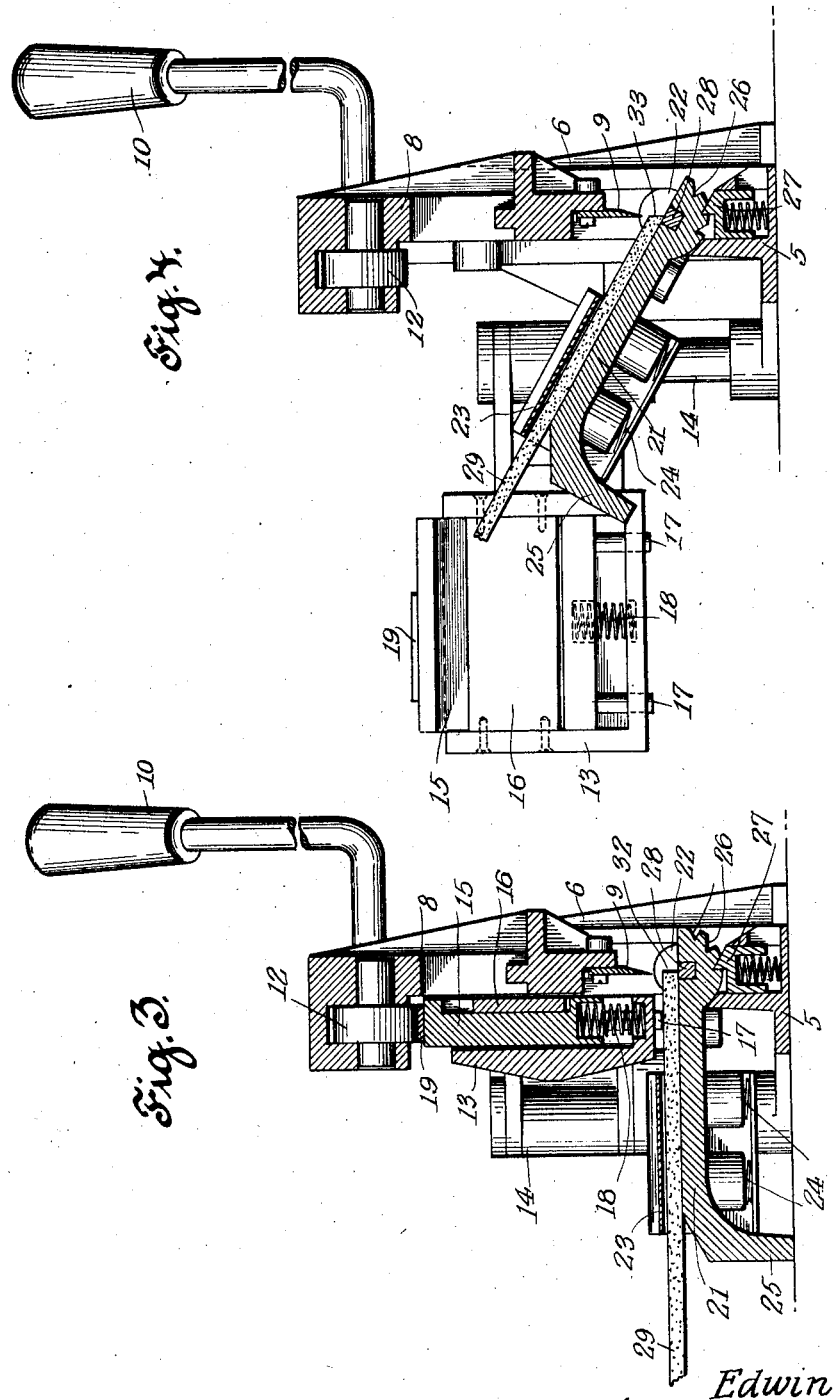
INVENTOR
Edwin Vollrath
BY
ATTORNEY Patented Nov. 19, 1929

1,736,559

UNITED STATES PATENT OFFICE

EDWIN VOLLRATH, OF EASTON, PENNSYLVANIA

COMBINATION BELT PUNCHING AND CUTTING MACHINE

Application filed September 18, 1925. Serial No. 57,075.

This invention relates to a punching and cutting machine, particularly adapted for use on transmission belts of various types, in the use of which there are frequently occasions when time is a most important element, it being necessary in a short period of time to cut the free ends of a belt at absolutely true right angles to the longitudinal axis of the belt, with either a straight edge or with any desired bevel, and also, to punch holes in the said free ends, at the required distance from the cut and the side edges of the belt, so that fasteners may be positioned to hold the said free ends together in absolutely accurate relation for the proper operation of the belt.

While there are many ways in which this invention can be utilized advantageously, it will be found especially valuable in connection with belts used under passenger railway cars, in the transmission of power derived from the rotation of the wheels of said car to a lighting system or similar utility, as my device is portable, of light weight, easily operated, and can be carried under a passenger car and made to perform its functions in a very short space of time.

It also eliminates the danger of crooked joints which cause bends in the belt and uneven, untrue running thereof, as the holes for the fasteners are positioned accurately by the machine and therefore the fasteners after insertion are always in the proper location for a true, straight joint.
In the operation of trains made up of cars of the type referred to above, it frequently occurs that the said transmission belts are lost or mutilated between train stops. As these stops are of but a few moments' duration, repairs on a belt, or replacement thereof, is something which, in its entirety, must be accomplished well completely and quickly, so that the schedule time of the run of the train may be adhered to. With this device, it is possible to install a new belt, or repair and adjust an old belt well within the brief time during which a train is normally at rest in an important station on the line.

Other advantages and details appear in the following specification, and in the drawings in which:—

Fig. 1 is a plan view.
Fig. 2 is a front elevation.
Fig. 3 is a vertical sectional view on the line 3—3 of Fig. 2.
Fig. 4 is a similar view with the operating parts arranged to make a bevel cut.

As set forth hereinafter, when a straight edge cut is to be made, the cutting and punching are done in one operation, but when a bevel edge cut is desired, the cutting is done first and the punching afterward.

The machine consists of an elongated, generally rectangular base 5 having at its ends uprights forked to present pairs of spaced vertical guides 6—6' and 7—7' separated by spacers 36—37 through which pass bolts 38—39 clamping the guides in rigid relation.

Movable between the guides is a blade holder 8 carrying a cutting knife 9, the holder having end extensions supported by their pivotal connections 40—40' with the upper ends of links 41—41' pivoted to the uprights at 42—42' and swung upon these pivots by a raised link 11 connected by the pivot 40.

The upper end of the link 11 is pivoted at 44 to an arm 45 rigidly fixed on a spindle 46, journalled in the upper portions of the uprights 6—6, and on which is fixed the lower end of a lever 47 actuable by a handle 10.

From the foregoing it will be seen that movement of the handle, as transmitted through the arm and links, produces a diagonal shearing movement in the blade such as is desirable in cutting leather and like material.

Journalled on a pin 48 set transversely in the raised central portion of the holder 8 is a roll 12 movable over a track bar 19 mounted on a vertical slide 15 carrying a series of punches 17.

The punch slide 15 is movable in a guide frame 13, pivoted at 14 on an extension of the base, and held normally in raised operative position by a compression spring 18, all these several parts swinging outwardly on the pivot 14 when not required by releasing a latch 20 pivoted to the base; thus the punches 17 may be actuated simultaneously with the cutting blade 9 by the handle 10, or the blade alone at will.

When a beveled or chamfered shear of the belt is desired, as the cutting is done first, the frame 13 with the punches, is swung outwardly as shown in Figs. 1 and 4, to permit the table 21 carrying the belt 29 to be tilted to the angle for the desired degree of bevel, the edge of the table being notched at 26 for engagement with a spring pressed detent 27. The table 21 is mounted on the trunnions 22—22, and is provided also with a supporting leg 25, and a clamp 23 which grips the belt on the table by the action of the springs 24—24. To hold the frame 13 in the position shown in Fig. 2, the latch 20 is provided.

At the cutting line directly beneath the blade 9, an inset 28 of wood or other suitable material, is provided to prevent the dulling of the edge of the said blade, and as lateral guides for the belt, the fixed member 30, and the adjustable spring pressed member 31 are shown in Fig. 2.

The square edge cut of the belt is shown at 32, in Fig. 3, and the beveled or chamfered shear is shown at 33 in Fig. 4.

The operation of this device is as follows:—

The belt is positioned on the table 21 and held there by the spring clamp 23. If a square edge cut is desired the handle 10 is moved forward and downwardly, thereby moving the blade holder 8 away from the said handle 10 and then downwardly, causing the roller 12 to move across and down on the frame 13 which carries the punch slide 15 and the punches 17, which are thereby forced downwardly, whereby the punches pierce the belt simultaneously with the shearing thereof by the blade 9. In this way, an absolutely straight cut of the belt is obtained, with punched perforations for the fasteners evenly spaced from the ends and the side edges of the belt.

By a reverse movement of the handle 10, the roller 12 is moved upwardly and the spring 18 removes the punches from the belt.

If a bevelled cut is wanted, the frame 13 is swung out as shown in Fig. 1 and Fig. 4, the table 21 is tilted to the desired angle, as shown in Fig. 4 and the shear is made as set forth above. With the belt still clamped thereon, the table is returned to a horizontal position, the hinged frame is swung back into the position shown in Fig. 3 and the punching operation is performed.

I do not desire to limit myself strictly to the form shown and described therein, as there are numerous applications of my invention within the spirit and scope thereof.

I claim:—

1. A combined cutter and punch for belts comprising a frame, a table hingedly connected to the frame, a spring pressed detent to retain said table in angular adjustment to the frame, a fixed guide and a spring pressed guide on said table to locate a belt, means to clamp the belt on the table, a shear blade movable in a vertical plane with respect to the axis of the table hinge, a series of punches movable adjacently parallel to said shear blade, manual means for cooperatively actuating said shear and punches, and a pivoted mounting for said punches whereby they may be moved out of the path of said actuating means.

2. A combined cutter and punch for belts comprising a frame, an inclinable table hinged to said frame, said table having belt guiding and clamping means, a relatively soft inset in said table on its axis of inclination, a shear blade movable towards and away from said inset, a series of punches having a holder pivoted to swing in a plane transverse to said table into and out of operative position, and means for manually actuating said shear, said means also being operative with respect to said punches when disposed in operative position.

3. A combined cutter and punch for belts comprising a frame having an inclinable table, means to clamp a belt on said table, a vertical slide carrying a shear to sever the belt, a post fixed on said frame in a plane parallel with said slide remote therefrom, a support pivoted on said post to swing into operative or inoperative positions, a plunger slidable vertically in said support, punches carried by the plunger, and a hand lever to operate said slide, said lever also actuating said plunger when in an operative position.

4. A combined cutter and punch for belts comprising a frame, a table inclinably mounted thereto, said table having means to clamp a belt thereon, a shear movable in the frame to cut the belt transversely, a guide pivoted to said frame transverse to said table, punching elements mounted in said guide and adapted to be swung into position to perforate the belt near the part being cut, and a common actuating means for the shear and the punching elements.

EDWIN VOLLRATH.